US012594598B2

(12) United States Patent
Eyama et al.

(10) Patent No.: US 12,594,598 B2
(45) Date of Patent: Apr. 7, 2026

(54) COPPER FINE PARTICLE DISPERSION

(71) Applicant: KAO CORPORATION, Tokyo (JP)

(72) Inventors: Takaaki Eyama, Wakayama (JP);
Osamu Takiguchi, Wakayama (JP);
Tomohide Yoshida, Wakayama (JP)

(73) Assignee: KAO CORPORATION, Tokyo (JP)

( * ) Notice: Subject to any disclaimer, the term of this
patent is extended or adjusted under 35
U.S.C. 154(b) by 9 days.

(21) Appl. No.: 18/293,444

(22) PCT Filed: Aug. 6, 2021

(86) PCT No.: PCT/JP2021/029312
§ 371 (c)(1),
(2) Date: Jan. 30, 2024

(87) PCT Pub. No.: WO2023/013034
PCT Pub. Date: Feb. 9, 2023

(65) Prior Publication Data
US 2024/0367225 A1     Nov. 7, 2024

(51) Int. Cl.
| | |
|---|---|
| *B22F 1/0545* | (2022.01) |
| *B22F 1/052* | (2022.01) |
| *B22F 1/054* | (2022.01) |
| *B22F 1/107* | (2022.01) |
| *B22F 7/04* | (2006.01) |
| *C09J 9/02* | (2006.01) |
| *C09J 11/04* | (2006.01) |

(52) U.S. Cl.
CPC ............ *B22F 1/0545* (2022.01); *B22F 1/052*
(2022.01); *B22F 1/056* (2022.01); *B22F 1/107*
(2022.01); *B22F 7/04* (2013.01); *C09J 9/02*
(2013.01); *C09J 11/04* (2013.01); *B22F*
*2007/047* (2013.01); *C09J 2203/326*
(2013.01); *C09J 2301/408* (2020.08)

(58) Field of Classification Search
CPC ......... C08K 2003/085; C08K 2201/011; B22F
1/056; B22F 1/0545; B22F 1/147; B22F
1/12; B22F 7/08; C09J 9/02; C22C
1/0425
USPC ................................................ 252/511, 512
See application file for complete search history.

(56) References Cited

U.S. PATENT DOCUMENTS

| | | | |
|---|---|---|---|
| 2012/0168692 A1 | 7/2012 | Son, II et al. | |
| 2012/0280186 A1* | 11/2012 | Sano | C22C 5/02 |
| | | | 977/773 |
| 2018/0340083 A1 | 11/2018 | Rösch et al. | |
| 2020/0075528 A1 | 3/2020 | Kawana et al. | |
| 2021/0253885 A1* | 8/2021 | Yoshida | C09D 11/326 |
| 2021/0379654 A1* | 12/2021 | Yoshida | B22F 5/006 |
| 2022/0204798 A1 | 6/2022 | Yoshida | |

FOREIGN PATENT DOCUMENTS

| | | | | |
|---|---|---|---|---|
| EP | 3 597 331 A1 | 1/2020 | | |
| EP | 3 845 334 A1 | 7/2021 | | |
| EP | 4 197 673 A1 | 6/2023 | | |
| JP | 2010-150653 A | 7/2010 | | |
| JP | 2013-504692 A | 2/2013 | | |
| JP | 2014-111800 A | 6/2014 | | |
| JP | 2017-214609 A | 12/2017 | | |
| JP | 2018-535321 A | 11/2018 | | |
| JP | 2020-20015 A | 2/2020 | | |
| JP | 2020-53404 A | 4/2020 | | |
| JP | 2020-105624 A | 7/2020 | | |
| WO | WO 2018/168186 A1 | 9/2018 | | |
| WO | WO-2020044662 A1 * | 3/2020 | | B22F 1/054 |

OTHER PUBLICATIONS

International Search Report issued Oct. 19, 2021, in PCT/JP2021/
029312 (with English Translation), 5 pages.
Extended European Search Report issued Oct. 20, 2025 in European
Patent Application No. 21952857.7, 11 pages.

* cited by examiner

*Primary Examiner* — Tri V Nguyen
(74) *Attorney, Agent, or Firm* — Oblon, McClelland,
Maier & Neustadt, L.L.P.

(57) ABSTRACT
A copper fine particle dispersion including copper nanoparticles A dispersed in the copper fine particle dispersion with a polymer B, and a dispersion medium C. The polymer B contains a constitutional unit derived from a carboxy group-containing monomer (b-1) and a polyalkylene glycol segment-containing monomer (b-2). A content of the polyalkylene glycol segment in the polymer B is not less than 55% by mass and not more than 97% by mass. An acid value of the polymer B is not less than 20 mgKOH/g and not more than 250 mgKOH/g. The dispersion medium C includes at least one compound selected from the group consisting of a (poly)alkylene glycol, a (poly)alkylene glycol derivative, a terpene alcohol, glycerin and a glycerin derivative.

19 Claims, No Drawings

COPPER FINE PARTICLE DISPERSION

CROSS REFERENCE TO RELATED APPLICATIONS

This application is a National Stage entry under 35 U.S.C. § 371 of PCT/JP2021/029312, filed on Aug. 6, 2021. The entire contents are incorporated herein by reference.

FIELD OF THE INVENTION

The present invention relates to a copper fine particle dispersion, and a method for producing a bonded body using the copper fine particle dispersion.

BACKGROUND OF THE INVENTION

Copper is excellent in electrical conductivity and thermal conductivity, and has been therefore extensively used, for example, as a conductive wiring material, a thermal conductive material, a heat-exchanging material, a heat-dissipation material, etc.

The copper has also been sometimes used as an alternate material of solder for bonding objects that are to be bonded to each other, owing to its excellent thermal conductivity.

In recent years, semiconductor devices called power devices have been intensively employed as power conversion/control devices, such as inverters, etc. The power devices serve for controlling a high electric current and therefore show high heat generation upon their operation, unlike integrated circuits, such as memories and microprocessors. For this reason, it has been required that solder used for mounting of elements in the power devices has not only good bonding strength, but also good heat resistance. However, lead-free solder that has been extensively used in these days has such a problem that it tends to be deteriorated in heat resistance. In consequence, there have been made various proposals concerning techniques for bonding objects to be bonded to each other by using a copper fine particle dispersion in place of the solder, in which the dispersion is applied to the objects using various coating means, followed by firing the resulting product. The copper is kept in a stable oxidized state at room temperature (25° C.), and therefore tends to include oxidized copper atoms. For this reason, in order to bond the objects to be bonded to each other by using the copper fine particle dispersion, it is required that the oxidized copper atoms are reduced and then fired to form a continuous phase of copper.

JP 2020-053404A (Patent Literature 1) aims at providing a copper paste that has high bonding strength to the objects to be bonded to each other, and discloses a copper paste containing a copper powder and a liquid medium, in which the liquid medium contains polyethylene glycol; copper particles constituting the copper powder have an average primary particle size of not less than 0.03 μm and not more than 1.0 μm; the surface of the respective copper particles is coated with a fatty acid having not less than 6 and not more than 18 carbon atoms; the crystallite size of the particles at a (111) plane thereof is not more than 50 nm; and the mass ratio of the copper powder to the copper paste is not loess than 50% and not more than 99%.

In addition, JP 2013-504692A (Patent Literature 2) aims at providing a method for preparing an aqueous dispersion of metal nanoparticles having superior dispersibility, and discloses a method for preparing an aqueous dispersion of metal nanoparticles, which includes the steps of dispersing metal nanoparticles having hydrophobic ligands on the surface in a hydrophobic solvent; mixing the resulting dispersion with a surface modification solution containing a surfactant, a wetting-dispersing agent and an aqueous-based solvent; mixing the resulting mixture solution with a ligand removal agent to form hydrophilic metal nanoparticles and separating them; and dispersing the hydrophilic metal nanoparticles in the aqueous-based solvent.

SUMMARY OF THE INVENTION

The present invention relates to a copper fine particle dispersion that contains copper nanoparticles A dispersed in the dispersion with a polymer B, and a dispersion medium C, in which:

the polymer B contains a constitutional unit derived from a carboxy group-containing monomer (b-1) and a constitutional unit derived from a polyalkylene glycol segment-containing monomer (b-2);

a content of the polyalkylene glycol segment in the polymer B is not less than 55% by mass and not more than 97% by mass;

an acid value of the polymer B is not less than 20 mgKOH/g and not more than 250 mgKOH/g; and the dispersion medium C contains at least one compound selected from the group consisting of a (poly)alkylene glycol, a (poly)alkylene glycol derivative, a terpene alcohol, glycerin and a glycerin derivative.

DETAILED DESCRIPTION OF THE INVENTION

The copper fine particle dispersions that have been hitherto proposed as an alternate bonding material of the solder are capable of exhibiting high heat resistance as compared to the solder, but still leave much room for improvement in bonding strength to objects to be bonded to each other. In addition, the conventional copper fine particle dispersions tend to cause deterioration in bonding strength of the resulting bonded body in some cases according to the time period of storage of the copper fine particle dispersions. It has been difficult to use such copper fine particle dispersions that are thus deteriorated in storage stability, for mounting in the power devices.

In the case where the copper paste described in the Patent Literature 1 in which the copper fine particles whose surface is coated with the hydrophobic fatty acid are dispersed with the hydrophilic polyethylene glycol is used to produce the bonded body after storing the copper paste for one month, the resulting bonded body tends to suffer from deterioration in bonding strength. It is considered that the deteriorated bonding strength is caused by poor dispersibility of the copper paste.

In addition, the aqueous dispersion of metal nanoparticles described in the Patent Literature 2 has posed such a problem that since removal of the wetting-dispersing agent used for protecting the copper fine particles upon firing is insufficient, the resulting bonded body tends to be deteriorated in bonding strength.

For these reasons, it has been required to further improve storage stability and bonding properties of the conventional copper fine particle dispersions.

The present invention relates to a copper fine particle dispersion that can be used for obtaining a bonded body that is improved in bonding strength even after storing the dispersion for a predetermined period of time, and a method for producing a bonded body using the copper fine particle dispersion.

The present inventors have found that in a copper fine particle dispersion that contains copper nanoparticles dispersed in the dispersion with a polymer and a dispersion medium, when the polymer contains a constitutional unit derived from a carboxy group-containing monomer and a constitutional unit derived from a polyalkylene glycol segment-containing monomer, and when a content of the polyalkylene glycol segment in the polymer and an acid value of the polymer are controlled to respective predetermined ranges, it is possible to provide a copper fine particle dispersion that is improved in dispersion stability, storage stability and sintering properties under low-temperature conditions, and can be used for obtaining a bonded body that is improved in bonding strength even after storing the dispersion for a predetermined period of time; and a method for producing a bonded body using the copper fine particle dispersion.

That is, the present invention relates to the following aspects [1] and [2].

[1] A copper fine particle dispersion containing copper nanoparticles A dispersed in the dispersion with a polymer B, and a dispersion medium C, in which:

the polymer B contains a constitutional unit derived from a carboxy group-containing monomer (b-1) and a constitutional unit derived from a polyalkylene glycol segment-containing monomer (b-2);

a content of the polyalkylene glycol segment in the polymer B is not less than 55% by mass and not more than 97% by mass;

an acid value of the polymer B is not less than 20 mgKOH/g and not more than 250 mgKOH/g; and the dispersion medium C contains at least one compound selected from the group consisting of a (poly)alkylene glycol, a (poly)alkylene glycol derivative, a terpene alcohol, glycerin and a glycerin derivative.

[2] A method for producing a bonded body, including the steps of allowing the copper fine particle dispersion according to the above aspect [1] to intervene between a plurality of metal members; and heating the dispersion.

In accordance with the present invention, it is possible to provide a copper fine particle dispersion that can be used for obtaining a bonded body that is improved in bonding strength even after storing the dispersion for a predetermined period of time, and a method for producing a bonded body using the copper fine particle dispersion.

[Copper Fine Particle Dispersion]

The copper fine particle dispersion according to the present invention contains copper nanoparticles A dispersed in the dispersion with a polymer B, and a dispersion medium C, in which: the polymer B contains a constitutional unit derived from a carboxy group-containing monomer (b-1) and a constitutional unit derived from a polyalkylene glycol segment-containing monomer (b-2); a content of the polyalkylene glycol segment in the polymer B is not less than 55% by mass and not more than 97% by mass; an acid value of the polymer B is not less than 20 mgKOH/g and not more than 250 mgKOH/g; and the dispersion medium C contains at least one compound selected from the group consisting of a (poly)alkylene glycol, a (poly)alkylene glycol derivative, a terpene alcohol, glycerin and a glycerin derivative.

Incidentally, in the present specification, the "sintering properties under low temperature conditions" mean that sintering of metal is caused in a low-temperature nitrogen atmosphere, and is hereinafter also referred to as "low-temperature sintering properties". In addition, bonding properties between a plurality of metal members in a low-temperature nitrogen atmosphere are hereinafter also referred to as "low-temperature bonding properties". Also, the low-temperature bonding properties after storing the copper fine particle dispersion, for example, under the conditions of a temperature of 25° C. and a humidity of 50% for one month is referred to as "low-temperature bonding properties after storage".

Furthermore, in the present specification, the "low temperature" means that the temperature is lower than an ordinary sintering temperature when using a silver nanoparticle dispersion (from about 250° C. to about 300° C.), for example, it means the temperature range of from about 100° C. to about 230° C. It is preferred that the copper fine particle dispersion is improved in sintering properties and bonding properties at a lower temperature.

According to the present invention, it is possible to exhibit advantageous effects capable of obtaining a bonded body that is improved in bonding strength even after storing the dispersion for a predetermined period of time. The reason why the aforementioned advantageous effects can be attained by the present invention is considered as follows, though it is not clearly determined yet.

That is, the copper nanoparticles A contained in the copper fine particle dispersion according to the present invention are dispersed in the dispersion with the polymer B that contains the constitutional unit derived from the carboxy group-containing monomer (b-1) and the constitutional unit derived from the polyalkylene glycol segment-containing monomer (b-2) in which the acid value of the polymer B and the content of the polyalkylene glycol segment in the polymer B are controlled to the respective predetermined ranges as well as the dispersion medium C that contains at least one compound selected from the group consisting of a (poly)alkylene glycol, a (poly)alkylene glycol derivative, a terpene alcohol, glycerin and a glycerin derivative. It is therefore considered that the copper fine particle dispersion can be improved in dispersion stability and storage stability owing to the synergistic effect of the polymer B and the dispersion medium C. Besides, it is considered that by controlling the content of the polyalkylene glycol segment in the polymer B to the predetermined range, the polymer B tends to readily undergo decomposition in the presence of the copper nanoparticles A even in a low temperature nitrogen atmosphere, so that since the metal fine particles come close to each other, the copper fine particle dispersion can be improved in low-temperature sintering properties and low-temperature bonding properties.

For the aforementioned reasons, it is considered that according to the present invention, since the copper fine particle dispersion of the present invention can be improved not only in dispersion stability and storage stability, but also in low-temperature sintering properties and low-temperature bonding properties, it is possible to obtain a bonded body that can be improved in bonding strength even after storing the dispersion for a predetermined period of time.

<Copper Nanoparticles A>

The copper fine particle dispersion according to the present invention contains the copper nanoparticles A dispersed in the dispersion with the polymer B (hereinafter also referred to merely as "copper nanoparticles A").

The content of copper in the copper nanoparticles A is preferably not less than 95% by mass, more preferably not less than 98% by mass, even more preferably not less than 99% by mass and further even more preferably substantially 100% by mass from the viewpoint of improving electrical conductivity, low temperature sintering properties, low-temperature bonding properties, and low-temperature bonding properties after storage of the copper fine particle dispersion.

Meanwhile, the "substantially 100% by mass" as used above means that the copper nanoparticles A may contain unintended components. Examples of the unintended components include unavoidable impurities.

The average particle size of the copper nanoparticles A is preferably not less than 105 nm, more preferably not less than 110 nm, even more preferably not less than 115 nm and further even more preferably not less than 120 nm from the viewpoint of improving dispersion stability of the copper fine particle dispersion, and is also preferably not more than 270 nm, more preferably not more than 250 nm, even more preferably not more than 240 nm and further even more preferably not more than 230 nm from the viewpoint of improving low-temperature sintering properties, low-temperature bonding properties, and low-temperature bonding properties after storage of the copper fine particle dispersion.

The average particle size of the copper nanoparticles A may be measured by the method described in Examples below.

The average particle size of the copper nanoparticles A may be controlled by varying production conditions, etc., of the copper nanoparticles A, such as a reduced metal ratio, the kind and amount of the polymer B used, a reduction temperature, etc.

The content of the copper nanoparticles A in the copper fine particle dispersion according to the present invention is preferably not less than 30% by mass, more preferably not less than 40% by mass, even more preferably not less than 50% by mass and further even more preferably not less than 55% by mass from the viewpoint of improving low-temperature sintering properties, low-temperature bonding properties, and low-temperature bonding properties after storage of the copper fine particle dispersion, and is also preferably not more than 95% by mass, more preferably not more than 93% by mass, even more preferably not more than 91% by mass and further even more preferably not more than 90% by mass from the viewpoint of improving dispersion stability of the copper fine particle dispersion.

<Polymer B>

The copper nanoparticles A according to the present invention are dispersed in the copper fine particle dispersion with the polymer B from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The polymer B contains the constitutional unit derived from the carboxy group-containing monomer (b-1) and the constitutional unit derived from the polyalkylene glycol segment containing monomer (b-2) from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

Examples of the basic structure of the polymer B include vinyl-based polymers, such as acrylic resins, styrene-based resins, styrene-acrylic resins, acrylic silicone-based resins, etc.; condensation-based polymers, such as polyesters, polyurethanes, etc.; and the like. Among these resins, etc., from the viewpoint of improving dispersion stability of the copper fine particle dispersion as well as from the viewpoint of improving low temperature sintering properties, low-temperature bonding properties, and low-temperature bonding properties after storage of the copper fine particle dispersion, preferred are the vinyl-based polymers.

The polymer B is preferably in the form of a vinyl-based polymer that contains the constitutional unit derived from the carboxy group-containing monomer (b-1) and the constitutional unit derived from the polyalkylene glycol segment containing monomer (b-2) from the viewpoint of improving dispersion stability of the copper fine particle dispersion as well as from the viewpoint of improving low temperature sintering properties, low-temperature bonding properties, and low-temperature bonding properties after storage of the copper fine particle dispersion.

The vinyl-based polymer is preferably in the form of a copolymer that contains the constitutional unit derived from the carboxy group-containing monomer (b-1) and the constitutional unit derived from the polyalkylene glycol segment-containing monomer (b-2). When the vinyl-based polymer is such a copolymer, the vinyl-based polymer may be any of a block copolymer, a random copolymer and an alternate copolymer.

[Carboxy Group-Containing Monomer (b-1)]

Specific examples of the monomer (b-1) include unsaturated monocarboxylic acids, such as (meth)acrylic acid, crotonic acid, 2-methacryloyloxymethylsuccinic acid, etc.; unsaturated dicarboxylic acids, such as maleic acid, itaconic acid, fumaric acid, citraconic acid, etc.; and the like. Incidentally, the aforementioned unsaturated dicarboxylic acids may be in the form of an acid anhydride.

These monomers (b-1) may be used alone or in combination of any two or more thereof.

The monomer (b-1) is preferably at least one monomer selected from the group consisting of (meth)acrylic acid and maleic acid, more preferably (meth)acrylic acid and even more preferably methacrylic acid from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The "(meth)acrylic acid" as used in the present specification means at least one compound selected from the group consisting of acrylic acid and methacrylic acid, and the "(meth)acrylic acid" is hereinafter also defined in the same way.

[Polyalkylene Glycol Segment-Containing Monomer (b-2)]

Examples of the monomer (b-2) include a polyalkylene glycol (meth)acrylate, an alkoxy polyalkylene glycol (meth)acrylate, a phenoxy polyalkylene glycol (meth)acrylate, and the like. These monomers (b-2) may be used alone or in combination of any two or more thereof.

The "(meth)acrylate" as used in the present specification means at least one compound selected from the group consisting of an acrylate and a methacrylate, and the "(meth)acrylate" is hereinafter also defined in the same way.

From the viewpoint of improving dispersion stability of the copper fine particle dispersion as well as from the viewpoint of improving low-temperature sintering properties, low-temperature bonding properties, and low-temperature bonding properties after storage of the copper fine particle dispersion, as the monomer (b-2), preferred is at least one monomer selected from the group consisting of a polyalkylene glycol (meth)acrylate and an alkoxy polyalkylene glycol (meth)acrylate, and more preferred is an alkoxy polyalkylene glycol (meth)acrylate. The number of carbon atoms in an alkoxy group of the alkoxy polyalkylene glycol (meth)acrylate is preferably not less than 1 and not more than 18, more preferably not less than 1 and not more than 14, and even more preferably not less than 1 and not more than 12, from the same viewpoint as described above.

Examples of the alkoxy polyalkylene glycol (meth)acrylate include methoxy polyalkylene glycol (meth)acrylates, ethoxy polyalkylene glycol (meth)acrylates, propoxy polyalkylene glycol (meth)acrylates, butoxy polyalkylene glycol (meth)acrylates, octoxy polyalkylene glycol (meth)acrylates, lauroxy polyalkylene glycol (meth)acrylates, and the like.

The polyalkylene glycol segment of the monomer (b-2) preferably contains a unit derived from an alkyleneoxide having not less than 2 and not more than 4 carbon atoms from the viewpoint of improving dispersion stability of the copper fine particle dispersion as well as from the viewpoint of improving low-temperature sintering properties, low-temperature bonding properties, and low-temperature bonding properties after storage of the copper fine particle dispersion. Examples of the aforementioned alkyleneoxide include ethyleneoxide, propyleneoxide, butyleneoxide, and the like. Among these alkyleneoxides, preferred is at least one compound selected from the group consisting of ethyleneoxide and propyleneoxide, and more preferred is ethyleneoxide.

The number of the units derived from the alkyleneoxide in the aforementioned polyalkylene glycol segment is preferably not less than 2, more preferably not less than 3 and even more preferably not less than 4, and is also preferably not more than 100, more preferably not more than 70, even more preferably not more than 50, further even more preferably not more than 40 and still further even more preferably not more than 35, from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The aforementioned polyalkylene glycol segment may be in the form of a copolymer containing a unit derived from ethyleneoxide and a unit derived from propyleneoxide from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The copolymer containing the unit derived from ethyleneoxide and the unit derived from propyleneoxide may be in the form of any of a block copolymer, a random copolymer and an alternating copolymer.

Specific examples of commercially available products of the monomer (b-2) include "NK ESTER AM-90G", "NK ESTER AM-130G", "NK ESTER AM-230G", "NK ESTER AMP-20GY", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PME-1000", "BLEMMER PME-4000", "BLEMMER PP-500", "BLEMMER PP-500D", "BLEMMER PP-800", "BLEMMER PP-1000", "BLEMMER PP-2000D", "BLEMMER AP-150", "BLEMMER AP-400", "BLEMMER AP-550", "BLEMMER 50PEP-300", "BLEMMER 50POEP-800B", "BLEMMER 43PAPE-600B", "BLEMMER PLE-1300" and the like as products available from NOF Corporation.

8

[Hydrophobic Monomer (b-3)]

The polymer B may also contain a constitutional unit derived from a hydrophobic monomer (b-3) from the viewpoint of improving low-temperature sintering properties, low-temperature bonding properties, and low-temperature bonding properties after storage of the copper fine particle dispersion.

The "hydrophobic monomer" as used in the present specification means that a solubility in water of the monomer as measured by dissolving the monomer in 100 g of ion-exchanged water at 25° C. until reaching a saturation concentration thereof is less than 10 g. The solubility in water of the monomer (b-3) is preferably not more than 5 g and more preferably not more than 1 g from the viewpoint of improving low-temperature sintering properties, low-temperature bonding properties, and low-temperature bonding properties after storage of the copper fine particle dispersion.

The monomer (b-3) is preferably at least one monomer selected from the group consisting of an aromatic group-containing monomer and a (meth)acrylate containing a hydrocarbon group derived from an aliphatic alcohol.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate, from the viewpoint of improving low-temperature sintering properties, low-temperature bonding properties, and low-temperature bonding properties after storage of the copper fine particle dispersion. The molecular weight of the aromatic group-containing monomer is preferably less than 500.

Examples of the styrene-based monomer include styrene, & methyl styrene, 2-methyl styrene, 4-vinyl toluene (4-methyl styrene), divinyl benzene and the like. Among these styrene-based monomers, from the viewpoint of improving low-temperature sintering properties, low temperature bonding properties, and low temperature bonding properties after storage of the copper fine particle dispersion, preferred are styrene and & methyl styrene.

As the aromatic group-containing (meth)acrylate, from the viewpoint of improving low-temperature sintering properties, low-temperature bonding properties, and low-temperature bonding properties after storage of the copper fine particle dispersion, preferred are phenyl (meth)acrylate, benzyl (meth)acrylate, phenoxyethyl (meth)acrylate, etc., and more preferred is benzyl (meth)acrylate.

As the (meth)acrylate containing a hydrocarbon group derived from an aliphatic alcohol, from the viewpoint of improving low-temperature sintering properties, low-temperature bonding properties, and low-temperature bonding properties after storage of the copper fine particle dispersion, preferred are those (meth)acrylates containing a hydrocarbon group derived from an aliphatic alcohol having not less than 1 and not more than 22 carbon atoms, more preferred are those (meth)acrylates containing a hydrocarbon group derived from an aliphatic alcohol having not less than 1 and not more than 12 carbon atoms, even more preferred are those (meth)acrylates containing a hydrocarbon group derived from an aliphatic alcohol having not less than 1 and not more than 8 carbon atoms, and further even more preferred are those (meth)acrylates containing a hydrocarbon group derived from an aliphatic alcohol having not less than 1 and not more than 4 carbon atoms. Examples of the (meth)acrylates containing a hydrocarbon group derived from an aliphatic alcohol include a (meth)acrylate containing a linear alkyl group, a (meth)acrylate containing a branched alkyl group, a (meth)acrylate containing an alicyclic alkyl group, and the like.

Specific examples of the (meth)acrylate containing a linear alkyl group include methyl (meth)acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate, stearyl (meth)acrylate, and the like.

Specific examples of the (meth)acrylate containing a branched alkyl group include isopropyl (meth)acrylate, isobutyl (meth)acrylate, tert butyl (meth)acrylate, isopentyl (meth)acrylate, isooctyl (meth)acrylate, isodecyl (meth)acrylate, isododecyl (meth)acrylate, isostearyl (meth)acrylate, 2-ethylhexyl (meth)acrylate, and the like.

Specific examples of the (meth)acrylate containing an alicyclic alkyl group include cyclohexyl (meth)acrylate, and the like.

These monomers (b-3) may be used alone or in combination of any two or more thereof.

As the monomer (b-3), from the viewpoint of improving low-temperature sintering properties, low-temperature bonding properties, and low-temperature bonding properties after storage of the copper fine particle dispersion, preferred is at least one monomer selected from the group consisting of the aromatic group-containing monomer and the (meth) acrylate containing a linear alkyl group; more preferred is at least one monomer selected from the group consisting of the styrene-based monomer and the (meth)acrylate containing a linear alkyl group having not less than 1 and not more than 4 carbon atoms; even more preferred is at least one monomer selected from the group consisting of styrene, a methyl styrene, 2-methyl styrene, 4-vinyl toluene (4-methyl styrene), methyl (meth)acrylate, ethyl (meth)acrylate, propyl (meth)acrylate and butyl (meth)acrylate; further even more preferred is at least one monomer selected from the group consisting of styrene, α-methyl styrene and methyl (meth) acrylate; and still further even more preferred is at least one monomer selected from the group consisting of styrene and methyl (meth)acrylate.

The polymer B is more preferably a vinyl-based polymer that contains a constitutional unit derived from at least one compound selected from the group consisting of (meth) acrylic acid and maleic acid as the monomer (b-1) and a constitutional unit derived from an alkoxy polyalkylene glycol (meth)acrylate as the monomer (b-2) from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The content of the vinyl-based polymer that contains the constitutional unit derived from the monomer (b-1) and the constitutional unit derived from the monomer (b-2) in the polymer B is preferably not less than 80% by mass, more preferably not less than 90% by mass, even more preferably not less than 95% by mass, further even more preferably not less than 98% by mass and still further even more preferably substantially 100% by mass from the viewpoint of improving dispersion stability of the copper fine particle dispersion as well as from the viewpoint of improving low-temperature sintering properties, low-temperature bonding properties, and low-temperature bonding properties after storage of the copper fine particle dispersion. Meanwhile, the "substantially 100% by mass" as used above means that the polymer B may contain unintended components. Examples of the unintended components include those polymers B other than the aforementioned vinyl-based polymer, which may be contained in the polymer B.

In the case where the polymer B is the vinyl-based polymer that contains the constitutional unit derived from the monomer (b-1) and the constitutional unit derived from the monomer (b-2), the total content of the monomer (b-1) and the monomer (b-2) in the raw material monomers used upon production of the polymer B or the total content of the constitutional unit derived from the monomer (b-1) and the constitutional unit derived from the monomer (b-2) in the polymer B is preferably not less than 72% by mass, more preferably not less than 88% by mass, even more preferably not less than 91% by mass, further even more preferably not less than 97% by mass and still further even more preferably substantially 100% by mass from the viewpoint of improving dispersion stability of the copper fine particle dispersion as well as from the viewpoint of improving low-temperature sintering properties, low-temperature bonding properties, and low-temperature bonding properties after storage of the copper fine particle dispersion. Meanwhile, the "substantially 100% by mass" as used above means that the aforementioned raw material monomers or polymer may contain unintended components. Examples of the unintended components include those monomers other than the monomer (b-1) and monomer (b-2), which may be contained in the monomer (b-1) and monomer (b-2) as the raw materials.

In the case where the polymer B is the vinyl-based polymer that contains the constitutional unit derived from the monomer (b-1) and the constitutional unit derived from the monomer (b-2), the content of the monomer (b-1) in the raw material monomers used upon production of the polymer B or the content of the constitutional unit derived from the monomer (b-1) in the polymer B is preferably not less than 3% by mass and more preferably not less than 5% by mass, and is also preferably not more than 35% by mass, more preferably not more than 25% by mass, even more preferably not more than 18% by mass and further even more preferably not more than 10% by mass, from the viewpoint of improving dispersion stability of the copper fine particle dispersion as well as from the viewpoint of improving low temperature sintering properties, low-temperature bonding properties, and low-temperature bonding properties after storage of the copper fine particle dispersion.

In the case where the polymer B is the vinyl-based polymer that contains the constitutional unit derived from the monomer (b-1) and the constitutional unit derived from the monomer (b-2), the content of the monomer (b-2) in the raw material monomers used upon production of the polymer B or the content of the constitutional unit derived from the monomer (b-2) in the polymer B is preferably not less than 55% by mass, more preferably not less than 65% by mass, even more preferably not less than 70% by mass, further even more preferably not less than 80% by mass, still further even more preferably not less than 84% by mass and yet still further even more preferably not less than 90% by mass, and is also preferably not more than 97% by mass and more preferably not more than 95% by mass, from the viewpoint of improving dispersion stability of the copper fine particle dispersion as well as from the viewpoint of improving low-temperature sintering properties, low-temperature bonding properties, and low-temperature bonding properties after storage of the copper fine particle dispersion.

The content of the polyalkylene glycol segment in the polymer B is not less than 55% by mass, preferably not less than 60% by mass, more preferably not less than 70% by mass and even more preferably not less than 84% by mass from the viewpoint of improving low-temperature sintering properties, low-temperature bonding properties, and low-temperature bonding properties after storage of the copper fine particle dispersion, and is also not more than 97% by mass, preferably not more than 94% by mass and more preferably not more than 92% by mass from the viewpoint of improving dispersion stability of the copper fine particle dispersion as well as from the viewpoint of improving storage stability and low temperature bonding properties after storage of the copper fine particle dispersion.

The number-average molecular weight Mn of the polymer B is preferably not less than 4,000, more preferably not less than 6,000 and even more preferably not less than 7,000 from the viewpoint of improving dispersion stability of the copper fine particle dispersion as well as from the viewpoint of improving storage stability and low-temperature bonding properties after storage of the copper fine particle dispersion, and is also preferably not more than 50,000, more preferably not more than 30,000, even more preferably not more than 20,000, further even more preferably not more than 15,000 and still further even more preferably not more than 10,000 from the viewpoint of improving dispersion stability, low-temperature bonding properties, and low-temperature bonding properties after storage of the copper fine particle dispersion. The aforementioned number-average molecular weight Mn may be measured by the method described in Examples below.

The acid value of the polymer B is not less than 20 mgKOH/g, preferably not less than 25 mgKOH/g, more preferably not less than 30 mgKOH/g, even more preferably not less than 35 mgKOH/g and further even more preferably not less than 40 mgKOH/g from the viewpoint of improving dispersion stability of the copper fine particle dispersion as well as from the viewpoint of improving storage stability and low-temperature bonding properties after storage of the copper fine particle dispersion, and is also not more than 250 mgKOH/g, preferably not more than 230 mgKOH/g, more preferably not more than 220 mgKOH/g and even more preferably not more than 215 mgKOH/g from the viewpoint of improving dispersion stability of the copper fine particle dispersion as well as from the viewpoint of improving storage stability and low-temperature bonding properties after storage of the copper fine particle dispersion.

The acid value of the polymer B may be measured by the method described in Examples below, and it is also possible to calculate the acid value of the polymer B from a mass ratio of the monomers constituting the polymer B.

The content of the polymer B in the copper fine particle dispersion according to the present invention is preferably not less than 0.1% by mass, more preferably not less than 0.2% by mass, even more preferably not less than 0.3% by mass and further even more preferably not less than 0.4% by mass from the viewpoint of improving dispersion stability of the copper fine particle dispersion as well as from the viewpoint of improving storage stability and low-tempera-ture bonding properties after storage of the copper fine particle dispersion, and is also preferably not more than 10% by mass, more preferably not more than 9% by mass, even more preferably not more than 8% by mass and further even more preferably not more than 7% by mass from the viewpoint of improving low-temperature sintering proper-ties, low-temperature bonding properties, and low-tempera-ture bonding properties after storage of the copper fine particle dispersion.

The mass ratio of the content of the polymer B to a total content of the copper nanoparticles A and the polymer B [polymer B/(copper nanoparticles A+polymer B)] in the copper fine particle dispersion according to the present invention (hereinafter also referred to merely as a "polymer mass ratio") is preferably not less than 0.0055, more pref-erably not less than 0.0058 and even more preferably not less than 0.0060 from the viewpoint of improving dispersion stability of the copper fine particle dispersion as well as from the viewpoint of improving storage stability and low-tem-perature bonding properties after storage of the copper fine particle dispersion, and is also preferably not more than 0.025, more preferably not more than 0.022, even more preferably not more than 0.020 and further even more preferably not more than 0.018 from the viewpoint of improving low temperature sintering properties, low-tem-perature bonding properties, and low-temperature bonding properties after storage of the copper fine particle dispersion.

The aforementioned polymer mass ratio is calculated from the contents of the copper nanoparticles A and the polymer B in the copper fine particle dispersion which may be measured by the method described in Examples below using a differential thermogravimetric simultaneous mea-surement apparatus (TG/DTA).

<Dispersion Medium C>

The copper fine particle dispersion according to the present invention contains the dispersion medium C that contains at least one compound selected from the group consisting of a (poly)alkylene glycol, a (poly)alkylene gly-col derivative, a terpene alcohol, glycerin (boiling point: 290° C.; molecular weight: 92) and a glycerin derivative from the viewpoint of improving dispersion stability of the copper fine particle dispersion as well as from the viewpoint of improving storage stability and low-temperature bonding properties after storage of the copper fine particle dispersion.

Examples of the (poly)alkylene glycol include ethylene glycol (boiling point: 197° C.; molecular weight: 62), pro-pylene glycol (boiling point: 188° C.; molecular weight: 76), diethylene glycol (boiling point: 244° C.; molecular weight: 106), triethylene glycol (boiling point: 287° C.; molecular weight: 150), tetraethylene glycol (boiling point: 327° C.; molecular weight: 194), dipropylene glycol (boiling point: 232° C.; molecular weight: 134), tripropylene glycol (boil-ing point: 273° C.; molecular weight: 192), tetrapropylene glycol (boiling point: not lower than 300° C.; molecular weight: 250), polyethylene glycol (number-average molecu-lar weight: preferably not less than 100 and not more than 1000, more preferably not less than 150 and not more than 600, and even more preferably not less than 180 and not more than 500), polypropylene glycol (number-average molecular weight: preferably not less than 150 and not more than 1000, more preferably not less than 180 and not more than 600, and even more preferably not less than 200 and not more than 500), 2-ethyl-1,3-hexanediol (boiling point: 244° C.; molecular weight: 146), and the like.

Examples of the (poly)alkylene glycol derivative include those compounds obtained by etherifying or esterifying one or both of terminal hydroxy groups of the aforementioned (poly)alkylene glycol, and the like.

Examples of the compounds obtained by etherifying or esterifying both of the terminal hydroxy groups of the aforementioned (poly)alkylene glycol include diethylene glycol dimethyl ether (boiling point: 162° C.; molecular weight: 134), diethylene glycol dibutyl ether (boiling point: 254° C.; molecular weight: 218), triethylene glycol dimethyl ether (boiling point: 216° C.; molecular weight: 178), dieth-ylene glycol monoethyl ether acetate (boiling point: 217° C.; molecular weight: 176), diethylene glycol monobutyl ether acetate (boiling point: 247° C.; molecular weight: 204), and the like.

Examples of the compounds obtained by etherifying or esterifying one of the terminal hydroxy groups of the aforementioned (poly)alkylene glycol include diethylene glycol monoethyl ether (boiling point: 202° C.; molecular weight: 134), diethylene glycol monobutyl ether (boiling point: 231° C.; molecular weight: 162), and the like.

Examples of the terpene alcohol include monoterpene alcohols, such as α-terpineol (boiling point: 219° C.; molecular weight: 154), linalol (boiling point: 198° C.; molecular weight: 154), geraniol (boiling point: 229° C.; molecular weight: 154), citronellol (boiling point: 225° C.; molecular weight: 156), etc.

The glycerin derivative is not particularly limited as long as it is, for example, in the form of a solvent having a structure derived from glycerin. Examples of the glycerin derivative include ether derivatives of glycerin, ester derivatives of glycerin, polyglycerin, alkyleneoxide adducts (for example, ethyleneoxide adducts or propyleneoxide adducts) of glycerin, and the like. Examples of the polyglycerin include diglycerin, triglycerin, and the like. Examples of commercially available products of the polyglycerin include "Polyglycerin #310", "Polyglycerin #500" and "Polyglycerin #750" all available from Sakamoto Yakuhin Kogyo Co., Ltd., and the like. Examples of the ether derivatives of glycerin include 3-(2-ethylhexyloxy)-1,2-propanediol (boiling point: 325° C.; molecular weight: 204), and the like. Examples of the ester derivatives of glycerin include glyceryl tributyrate (boiling point: 305° C.; molecular weight: 302), and the like.

From the viewpoint of improving dispersion stability of the copper fine particle dispersion as well as from the viewpoint of improving storage stability and low temperature bonding properties after storage of the copper fine particle dispersion, the dispersion medium C preferably contains at least one compound selected from the group consisting of the (poly)alkylene glycol, the (poly)alkylene glycol derivative and the terpene alcohol, more preferably at least one compound selected from the group consisting of dipropylene glycol, tetraethylene glycol, polyethylene glycol (number-average molecular weight: preferably not less than 100 and not more than 1000, more preferably not less than 150 and not more than 600, and even more preferably not less than 180 and not more than 500), a terpineol and diethylene glycol monobutyl ether, and even more preferably at least one compound selected from the group consisting of dipropylene glycol, tetraethylene glycol, polyethylene glycol (number-average molecular weight: not less than 180 and not more than 500), a terpineol and diethylene glycol monobutyl ether.

The boiling point of the dispersion medium C as measured at 1 atm is preferably not lower than 180° C., more preferably not lower than 200° C., even more preferably not lower than 210° C. and further even more preferably not lower than 215° C. from the viewpoint of improving storage stability and low-temperature bonding properties after storage of the copper fine particle dispersion, and is also preferably not higher than 400° C., more preferably not higher than 360° C., even more preferably not higher than 330° C. and further even more preferably not higher than 300° C. from the viewpoint of improving low-temperature sintering properties, low-temperature bonding properties, and low-temperature bonding properties after storage of the copper fine particle dispersion. Incidentally, in the case where two or more dispersion media are used as the dispersion medium C, the boiling point of the dispersion medium C is a weighted mean value of boiling points of the two or more dispersion media which are weighted by contents (% by mass) of the respective dispersion media.

The molecular weight of the dispersion medium C is preferably not less than 60, more preferably not less than 100, even more preferably not less than 130 and further even more preferably not less than 150 from the viewpoint of improving storage stability and low-temperature bonding properties after storage of the copper fine particle dispersion, and is also preferably not more than 600, more preferably not more than 450, even preferably not more than 400, further even preferably not more than 350 and still further even preferably not more than 300 from the viewpoint of improving low-temperature sintering properties, low-temperature bonding properties, and low temperature bonding properties after storage of the copper fine particle dispersion. In the case where two or more dispersion media are used as the dispersion medium C, the molecular weight of the dispersion medium C is a weighted mean value of molecular weights of the two or more dispersion media which are weighted by contents (% by mass) of the respective dispersion media.

The total content of the (poly)alkylene glycol, the (poly)alkylene glycol derivative, the terpene alcohol, glycerin and the glycerin derivative (these compounds are hereinafter also comprehensively referred to as a "dispersion medium C1") in the dispersion medium C is preferably not less than 50% by mass, more preferably not less than 70% by mass, even more preferably not less than 80% by mass, further even more preferably not less than 90% by mass, still further even more preferably not less than 95% by mass, still further even more preferably not less than 98% by mass, still further even more preferably not less than 99% by mass, still further even more preferably not less than 99.9% by mass and yet still further even more preferably substantially 100% by mass from the viewpoint of improving storage stability and low-temperature bonding properties after storage of the copper fine particle dispersion. Meanwhile, the "substantially 100% by mass" as used above means that the dispersion medium may contain unintended components. Examples of the unintended components include those dispersion media C other than the aforementioned dispersion medium C1, which may be contained in the dispersion medium C1.

The total content of the (poly)alkylene glycol, the (poly)alkylene glycol derivative and the terpene alcohol (these compounds are hereinafter also comprehensively referred to as a "dispersion medium C2") in the dispersion medium C is preferably not less than 50% by mass, more preferably not less than 70% by mass, even more preferably not less than 80% by mass, further even more preferably not less than 90% by mass, still further even more preferably not less than 95% by mass, still further even more preferably not less than 98% by mass, still further even more preferably not less than 99% by mass, still further even more preferably not less than 99.9% by mass and yet still further even more preferably substantially 100% by mass from the viewpoint of improving storage stability and low-temperature bonding properties after storage of the copper fine particle dispersion. Meanwhile, the "substantially 100% by mass" as used above means that the dispersion medium may contain unintended components. Examples of the unintended components include those dispersion media C other than the aforementioned dispersion medium C2, which may be contained in the dispersion medium C2.

The total content of dipropylene glycol, tetraethylene glycol, polyethylene glycol (number-average molecular weight: not less than 180 and not more than 500), α-terpineol and diethylene glycol monobutyl ether (these compounds are hereinafter also comprehensively referred to as a "dispersion medium C3") in the dispersion medium C is preferably not less than 50% by mass, more preferably not less than 70% by mass, even more preferably not less than 80% by mass, further even more preferably not less than 90% by mass, still further even more preferably not less than 95% by mass, still further even more preferably not less than 98% by mass, still further even more preferably not less than 99% by mass, still further even more preferably not less than 99.9% by mass and yet still further even more preferably substantially 100% by mass from the viewpoint of improving storage stability and low-temperature bonding properties after storage of the copper fine particle dispersion. Meanwhile, the "substantially 100% by mass" as used above means that the dispersion medium may contain unintended components. Examples of the unintended components include those dispersion media C other than the aforementioned dispersion medium C3, which may be contained in the dispersion medium C3.

The content of the dispersion medium C in the copper fine particle dispersion according to the present invention is preferably not less than 4% by mass, more preferably not less than 6% by mass, even more preferably not less than 7% by mass and further even more preferably not less than 8% by mass from the viewpoint of improving dispersion stability of the copper fine particle dispersion as well as from the viewpoint of improving storage stability and low-temperature bonding properties after storage of the copper fine particle dispersion, and is also preferably not more than 60% by mass, more preferably not more than 40% by mass, even more preferably not more than 20% by mass and further even more preferably not more than 15% by mass from the viewpoint of improving electrical conductivity, low-temperature sintering properties, low-temperature bonding properties, and low-temperature bonding properties after storage of the copper fine particle dispersion.

The content of water in the copper fine particle dispersion according to the present invention is preferably not more than 5% by mass, more preferably not more than 1% by mass, even more preferably not more than 0.5% by mass, further even more preferably not more than 0.1% by mass and still further even more preferably not more than 0.01% by mass from the viewpoint of inhibiting oxidation of copper as well as from the viewpoint of improving storage stability and low-temperature bonding properties after storage of the copper fine particle dispersion.

<Copper Microparticles>

The copper fine particle dispersion according to the present invention may further contain copper microparticles from the viewpoint of improving electrical conductivity, low temperature sintering properties, low-temperature bonding properties, and low-temperature bonding properties after storage of the copper fine particle dispersion.

The content of copper in the copper microparticles is preferably not less than 95% by mass, more preferably not less than 98% by mass, even more preferably not less than 99% by mass and further even more preferably substantially 100% by mass from the viewpoint of improving electrical conductivity, low-temperature sintering properties, low-temperature bonding properties, and low-temperature bonding properties after storage of the copper fine particle dispersion.

Meanwhile, the "substantially 100% by mass" as used above means that the copper microparticles may contain unintended components. Examples of the unintended components include unavoidable impurities.

The average particle size of the copper microparticles is preferably more than 0.27 μm, more preferably not less than 0.5 μm, even more preferably not less than 0.6 μm and further even more preferably not less than 0.7 μm from the viewpoint of improving electrical conductivity, low-temperature sintering properties, low-temperature bonding properties, and low-temperature bonding properties after storage of the copper fine particle dispersion, and is also preferably not more than 10 μm, more preferably not more than 8 μm, even more preferably not more than 7 μm and further even more preferably not more than 6 μm from the viewpoint of improving dispersion stability and storage stability of the copper fine particle dispersion as well as low temperature bonding properties after storage of the copper fine particle dispersion.

The average particle size of the copper microparticles may be measured by the method described in Examples below.

The content of the copper microparticles in the copper fine particle dispersion according to the present invention is preferably not less than 5% by mass, more preferably not less than 15% by mass, even more preferably not less than 20% by mass and further even more preferably not less than 25% by mass from the viewpoint of improving electrical conductivity, low-temperature sintering properties, low-temperature bonding properties, and low temperature bonding properties after storage of the copper fine particle dispersion, and is also preferably not more than 65% by mass, more preferably not more than 55% by mass, even more preferably not more than 45% by mass and further even more preferably not more than 35% by mass from the viewpoint of improving electrical conductivity and dispersion stability of the copper fine particle dispersion, as well as storage stability, low-temperature sintering properties, low-temperature bonding properties, and low temperature bonding properties after storage of the copper fine particle dispersion.

The mass ratio of a content of the copper nanoparticles A to a total content of the copper nanoparticles A and the copper microparticles [copper nanoparticles A/(copper nanoparticles A+copper microparticles)] in the copper fine particle dispersion according to the present invention is preferably not less than 0.3, more preferably not less than 0.4, even more preferably not less than 0.5 and further even more preferably not less than 0.6 from the viewpoint of improving electrical conductivity, and storage stability, low-temperature sintering properties, low-temperature bonding properties, and low temperature bonding properties after storage of the copper fine particle dispersion, and is also preferably not more than 1.0, more preferably not more than 0.9, even more preferably not more than 0.8 and further even more preferably not more than 0.75 from the viewpoint of improving electrical conductivity, low temperature sintering properties, low-temperature bonding properties, and low-temperature bonding properties after storage of the copper fine particle dispersion.

(Composition of Copper Fine Particle Dispersion)

In the copper fine particle dispersion according to the present invention, from the viewpoint of improving dispersion stability of the copper fine particle dispersion as well as from the viewpoint of improving storage stability, electrical conductivity, low temperature sintering properties, low-temperature bonding properties, and low-temperature bonding properties after storage of the copper fine particle dispersion, the content of the copper nanoparticles A therein is preferably not less than 30% by mass and not more than 95% by mass, the content of the polymer B therein is preferably not less than 0.1% by mass and not more than 10% by mass, the content of the dispersion medium C therein is preferably not less than 4% by mass and not more than 60% by mass, and the content of the copper microparticles therein is preferably not less than 0% by mass and not more than 65% by mass.

The copper fine particle dispersion according to the present invention may contain various additives as additional components other than the aforementioned components unless the advantageous effects of the present invention are adversely affected by inclusion of these additives. Examples of the additives include metal particles other than the copper nanoparticles A and the copper microparticles, a sintering accelerator, such as glass frits, etc., an antioxidant, a viscosity modifier, a pH controller, a buffer, a defoaming agent, a leveling agent, a volatilization inhibitor, and the like. Examples of the metal particles other than the copper nanoparticles A and the copper microparticles include particles of metal, such as zinc, nickel, silver, gold, palladium, platinum, etc.

It is preferred that the content of the additives in the copper fine particle dispersion according to the present invention is not more than 1% by mass.

(Production of Copper Fine Particle Dispersion)

The copper fine particle dispersion according to the present invention may be obtained by the method in which the polymer B and the dispersion medium C, and further, if required, the copper microparticles, various additives, etc., are added to and mixed with the copper nanoparticles A previously prepared by conventionally known methods; the method in which a copper raw material compound, a reducing agent and the polymer B as a dispersant, and further, if required, a solvent for dispersing the copper raw material compound and the reducing agent, are mixed with each other to subject the copper raw material compound to reduction reaction and thereby obtain a dispersion of the copper nanoparticles A, and then the dispersion medium C, and further, if required, the copper microparticles, various additives, etc., are added to and mixed with the resulting dispersion of the copper nanoparticles A; and the like. Among these methods, from the viewpoint of improving dispersion stability of the copper fine particle dispersion as well as from the viewpoint of improving storage stability and low-temperature bonding properties after storage of the copper fine particle dispersion, preferred is the method in which after previously obtaining a dry powder of the copper nanoparticles A containing the polymer B (hereinafter also referred to as "a copper nanoparticle dry powder"), the dispersion medium C, and further, if required, the copper microparticles, various additives, etc., are added to and mixed with the resulting dry powder.

The copper nanoparticle dry powder may be obtained by mixing the copper raw material compound, the reducing agent and the polymer B with each other to reduce the copper raw material compound with the reducing agent and thereby obtain a dispersion of the copper nanoparticles A that are dispersed therein with the polymer B, and then drying the dispersion of the copper nanoparticles A by a freeze-drying method, etc.

The copper raw material compound is not particularly limited as long as it is a compound containing copper.

Examples of the copper raw material compound include copper sulfate, copper nitrate, cupric oxide, cuprous oxide, copper formate, copper acetate, copper oxalate, and the like. These copper raw material compounds may be used alone or in combination of any two or more thereof.

The reducing agent is not particularly limited as long as the reducing agent is a compound capable of reducing the copper raw material compound.

Examples of the reducing agent include hydrazine-based compounds, such as hydrazine, hydrazine hydrochloride, hydrazine sulfate, hydrazine hydrate, etc.; boron compounds, such as sodium boron hydride, etc.; inorganic acid salts, such as sodium sulfite, sodium hydrogen sulfite, sodium thiosulfate, sodium nitrite, sodium hyponitrite, phosphorous acid, sodium phosphite, hypophosphorous acid, sodium hypophosphite, etc.; and the like.

These reducing agents may be used alone or in combination of any two or more thereof.

Examples of the solvent for dispersing the copper raw material compound and the reducing agent in the dispersion include water, methanol, ethanol, propanol, butanol, ethylene glycol, propylene glycol, diethylene glycol, dipropylene glycol, and the like.

The temperature of the reduction reaction is preferably not lower than 5° C., more preferably not lower than 10° C., even more preferably not lower than 20° C. and further even more preferably not lower than 30° C. from the viewpoint of reducing a particle size of the respective copper nanoparticles A to obtain a uniform dispersion, and is also preferably not higher than 100° C., more preferably not higher than 80° C., even more preferably not higher than 60° C. and further even more preferably not higher than 50° C. from the viewpoint of stably producing the copper nanoparticles. The reduction reaction may be conducted either in an air atmosphere or in an atmosphere of inert gas, such as nitrogen gas, etc.

In the production of the copper fine particle dispersion, from the viewpoint of removing impurities, such as the unreacted reducing agent, a surplus of the polymer B which has no contribution to dispersion of the copper nanoparticles A, etc., the dispersion of the copper nanoparticles A may be subjected to purification treatment before subjecting the dispersion to freeze-drying.

The method of purifying the dispersion of the copper nanoparticles A is not particularly limited, and there may be used various methods including membrane treatment, such as dialysis, ultrafiltration, etc.; centrifugal separation treatment; and the like. Among these methods, from the viewpoint of efficiently removing the impurities from the dispersion, preferred is the membrane treatment, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

The copper fine particle dispersion according to the present invention may be obtained by further subjecting the dispersion to filtration treatment using a filter, etc., after adding the aforementioned various additives thereto, if required.

The copper fine particle dispersion according to the present invention has good low-temperature sintering properties, good low-temperature bonding properties and good low-temperature bonding properties after storage, and therefore can be used in production of conductive members for various electronic and electrical equipments. The conductive members are preferably used in bonding agents, such as solder, etc.; antennas, such as RFID (radio frequency identifier) tags, etc.; capacitors, such as MLCC (multilayer ceramic capacitors), etc.; electronic paper; image display apparatuses, such as a liquid crystal display, an organic EL display, etc.; organic EL elements; organic transistors; wiring boards, such as printed wiring boards, flexible wiring boards, etc.; organic solar cells; sensors, such as flexible sensors, etc.; and the like. Among these applications, the copper fine particle dispersion according to the present invention is preferably used for bonding of a plurality of metal members from the viewpoint of efficiently showing good low-temperature sintering properties, low-temperature bonding properties and low-temperature bonding properties after storage of the dispersion.

[Method for Producing Bonded Body]

The method for producing a bonded body according to the present invention includes the steps of allowing a copper fine particle dispersion to intervene between a plurality of metal members; and heating the dispersion. The copper fine particle dispersion used in the method is the aforementioned copper fine particle dispersion according to the present invention.

In the case where the copper fine particle dispersion according to the present invention is used for bonding the plurality of metal members to each other, the copper fine particle dispersion is preferably used in the method for producing a bonded body which includes the steps of allowing the copper fine particle dispersion to intervene between the plurality of metal members; and heating the dispersion.

The temperature of the heat treatment in the aforementioned heating step is preferably not lower than 100° C., more preferably not lower than 150° C. and even more preferably not lower than 180° C. from the viewpoint of improving bonding strength and electrical conductivity of the resulting bonded body, and is also preferably not higher than 230° C., more preferably not higher than 220° C., even more preferably not higher than 210° C. and further even more preferably not higher than 200° C. from the viewpoint of improving low-temperature sintering properties and low-temperature bonding properties of the copper fine particle dispersion.

The heat treatment in the aforementioned heating step may be conducted either under no applied pressure or under applied pressure. However, from the viewpoint of improving bonding strength and electrical conductivity of the resulting bonded body, the heat treatment is preferably conducted under applied pressure. The pressure used in the heat treatment in the aforementioned heating step is preferably not less than 5 MPa, more preferably not less than 8 MPa, even more preferably not less than 10 MPa and further even more preferably not less than 15 MPa from the viewpoint of improving low temperature sintering properties and low-temperature bonding properties of the copper fine particle dispersion, and is also preferably not more than 50 MPa, more preferably not more than 30 MPa and even more preferably not more than 20 MPa from the viewpoint of enhancing productivity of the bonded body.

The time of the heat treatment in the aforementioned heating step may be appropriately controlled according to the temperature and pressure used in the heat treatment.

The aforementioned heating step may be conducted in any of an air atmosphere, an atmosphere of inert gas, such as nitrogen gas, etc. and an atmosphere of a reducing gas, such as hydrogen gas, etc. However, from the viewpoint of inhibiting oxidation of copper and attaining good safety, the heating step is preferably conducted in a nitrogen gas atmosphere.

Examples of the metal members to be bonded to each other in the present invention include metal-based substrates or substrates made of metal, such as a gold substrate, a gold-plated substrate, a silver substrate, a silver-plated metal substrate, a copper substrate, a palladium substrate, a palladium-plated metal substrate, a platinum substrate, a platinum-plated metal substrate, an aluminum substrate, a nickel substrate, a nickel-plated metal substrate, a tin substrate, a tin-plated metal substrate, etc.; a metal portion, such as an electrode, etc., of an electrically insulating substrate; and the like. The plurality of metal members used in the present invention may be either the same kind or different kinds of metal members.

Among them, the metal members preferably contain a least one member selected from the group consisting of a gold substrate, a gold-plated substrate, a silver substrate, a silver-plated metal substrate, a copper substrate, a palladium substrate, a palladium-plated metal substrate, a platinum substrate, a platinum-plated metal substrate, an aluminum substrate, a nickel substrate, a nickel-plated metal substrate, a tin substrate, a tin-plated metal substrate, and a metal portion of an electrically insulating substrate.

The bonding of the metal members in the present invention may be used for bonding between a chip element, such as a capacitor, a resistance, etc., and a circuit substrate; bonding between a semiconductor chip, such as a memory, a diode, a transistor, IC, CPU, etc., and a lead frame or a circuit substrate; bonding between a high heat generation semiconductor chip and a cooling plate; and the like.

As the method of applying the aforementioned copper fine particle dispersion to the metal members, there may be mentioned various coating methods, such as slot die coating, dip coating, spray coating, spin coating, doctor blading, knife edge coating, bar coating, etc.; and various pattern printing methods, such as stencil printing, screen printing, flexo printing, gravure printing, offset printing, dispenser printing, inkjet printing, etc.

The amount of the aforementioned copper fine particle dispersion applied to the metal members may be appropriately controlled according to sizes and kinds of metal members to be bonded to each other.

The bonding strength of the aforementioned bonded body is preferably not less than 20 MPa. The bonding strength may be measured by the method described in Examples below.

With respect to the aforementioned embodiments, the present invention further provides the following aspects.

<1> A copper fine particle dispersion containing copper nanoparticles A dispersed in the dispersion with a polymer B, and a dispersion medium C, in which:

the polymer B contains a constitutional unit derived from a carboxy group-containing monomer (b-1) and a constitutional unit derived from a polyalkylene glycol segment-containing monomer (b-2);

a content of the polyalkylene glycol segment in the polymer B is not less than 55% by mass and not more than 97% by mass;

an acid value of the polymer B is not less than 20 mgKOH/g and not more than 250 mgKOH/g; and the dispersion medium C contains at least one compound selected from the group consisting of a (poly)alkylene glycol, a (poly)alkylene glycol derivative, a terpene alcohol, glycerin and a glycerin derivative.

<2> The copper fine particle dispersion according to the above aspect <1> which contains the copper nanoparticles A dispersed in the dispersion with the polymer B, and the dispersion medium C, in which:

the polymer B contains a vinyl-based polymer containing the constitutional unit derived from the carboxy group-containing monomer (b-1) and the constitutional unit derived from the polyalkylene glycol segment-containing monomer (b-2);

the content of the polyalkylene glycol segment in the polymer B is not less than 60% by mass and not more than 94% by mass;

the acid value of the polymer B is not less than 25 mgKOH/g and not more than 230 mgKOH/g;

the dispersion medium C contains the at least one compound selected from the group consisting of the (poly)alkylene glycol, the (poly)alkylene glycol derivative, the terpene alcohol, glycerin and the glycerin derivative; and a boiling point of the dispersion medium C is not lower than 180° C. and not higher than 400° C.

<3> The copper fine particle dispersion according to the above aspect <1> or <2> which contains the copper nanoparticles A dispersed in the dispersion with the polymer B, and the dispersion medium C, in which:

the polymer B contains the vinyl-based polymer containing the constitutional unit derived from the carboxy group-containing monomer (b-1) and the constitutional unit derived from the polyalkylene glycol segment-containing monomer (b-2);

the content of the polyalkylene glycol segment in the polymer B is not less than 60% by mass and not more than 94% by mass;

the acid value of the polymer B is not less than 25 mgKOH/g and not more than 230 mgKOH/g;

the dispersion medium C contains the at least one compound selected from the group consisting of the (poly)alkylene glycol, the (poly)alkylene glycol derivative, the terpene alcohol, glycerin and the glycerin derivative; and a molecular weight of the dispersion medium C is not less than 60 and not more than 600.

<4> The copper fine particle dispersion according to any one of the above aspects <1> to <3> which contains the copper nanoparticles A dispersed in the dispersion with the polymer B, and the dispersion medium C, in which:

the polymer B contains the vinyl-based polymer containing the constitutional unit derived from the carboxy group-containing monomer (b-1) and the constitutional unit derived from the polyalkylene glycol segment-containing monomer (b-2);

the carboxy group-containing monomer (b-1) contains at least one compound selected from the group consisting of (meth)acrylic acid and maleic acid;

the polyalkylene glycol segment-containing monomer (b-2) contains a polyalkylene glycol (meth)acrylate and an alkoxypolyalkylene glycol (meth)acrylate whose alkoxy group has not less than 1 and not more than 18 carbon atoms;

the content of the polyalkylene glycol segment in the polymer B is not less than 60% by mass and not more than 94% by mass;

the acid value of the polymer B is not less than 25 mgKOH/g and not more than 230 mgKOH/g;

the dispersion medium C contains at least one compound selected from the group consisting of the (poly)alkylene glycol, the (poly)alkylene glycol derivative and the terpene alcohol;

the boiling point of the dispersion medium C is not lower than 180° C. and not higher than 400° C.; and the molecular weight of the dispersion medium C is not less than 60 and not more than 600.

<5> The copper fine particle dispersion according to any one of the above aspects <1> to <4>, wherein a content of the copper nanoparticles A in the dispersion is not less than 30% by mass and not more than 95% by mass;

a mass ratio of a content of the polymer B to a total content of the copper nanoparticles A and the polymer B [polymer B/(copper nanoparticles A+polymer B)] in the dispersion is not less than 0.0055 and not more than 0.025; and a content of the dispersion medium C in the dispersion is not less than 4% by mass and not more than 60% by mass.

<6> The copper fine particle dispersion according to any one of the above aspects <1> to <5>, wherein the content of the copper nanoparticles A in the dispersion is not less than 50% by mass and not more than 91% by mass;

the mass ratio of the content of the polymer B to the total content of the copper nanoparticles A and the polymer B [polymer B/(copper nanoparticles A+polymer B)] in the dispersion is not less than 0.0055 and not more than 0.025; and the content of the dispersion medium C in the dispersion is not less than 4% by mass and not more than 20% by mass.

<7> The copper fine particle dispersion according to the above aspect <5> or <6>, wherein the content of the polymer B in the dispersion is not less than 0.1% by mass and not more than 10% by mass.

<8> The copper fine particle dispersion according to any one of the above aspects <2> to <7>, wherein a content of the vinyl-based polymer containing the constitutional unit derived from the carboxy group-containing monomer (b-1) and the constitutional unit derived from the polyalkylene glycol segment-containing monomer (b-2) in the polymer B is not less than 80% by mass; and a total content of the (poly)alkylene glycol, the (poly)alkylene glycol derivative, the terpene alcohol, glycerin and the glycerin derivative in the dispersion medium C is not less than 50% by mass.

<9> The copper fine particle dispersion according to any one of the above aspects <2> to <7>, wherein a content of the vinyl-based polymer containing the constitutional unit derived from the carboxy group-containing monomer (b-1) and the constitutional unit derived from the polyalkylene glycol segment-containing monomer (b-2) in the polymer B is not less than 95% by mass; and a total content of the (poly)alkylene glycol, the (poly)alkylene glycol derivative, the terpene alcohol, glycerin and the glycerin derivative in the dispersion medium C is not less than 95% by mass.

<10> The copper fine particle dispersion according to any one of the above aspects <1> to <9>, wherein an average particle size of the copper nanoparticles A is not less than 105 nm and not more than 270 nm.

<11> The copper fine particle dispersion according to any one of the above aspects <2> to <10>, wherein a total content of the constitutional unit derived from the monomer (b-1) and the constitutional unit derived from the monomer (b-2) in the vinyl-based polymer B is not less than 72% by mass.

<12> The copper fine particle dispersion according to any one of the above aspects <2> to <11>, wherein a content of the constitutional unit derived from the monomer (b-1) in the vinyl-based polymer B is not less than 3% by mass and not more than 35% by mass, and a content of the constitutional unit derived from the monomer (b-2) in the vinyl-based polymer B is not less than 55% by mass and not more than 97% by mass.

<13> The copper fine particle dispersion according to any one of the above aspects <1> to <12>, wherein the dispersion medium C contains at least one compound selected from the group consisting of dipropylene glycol, tetraethylene glycol, polyethylene glycol (number-average molecular weight: not less than 180 and not more than 500), a terpineol and diethylene glycol monobutyl ether, and a total content of the aforementioned compound(s) in the dispersion medium C is not less than 95% by mass.

<14> The copper fine particle dispersion according to any one of the above aspects <1> to <13>, further containing copper microparticles, in which an average particle size of the copper microparticles is more than 0.27 μm and not more than 10 μm.

<15> The copper fine particle dispersion according to any one of the above aspect <14>, wherein a content of the copper microparticles in the dispersion is not less than 5% by mass and not more than 65% by mass.

<16> The copper fine particle dispersion according to any one of the above aspects <1> to <15> which is used for bonding a plurality of metal members.

<17> A method for producing a bonded body, including the steps of allowing the copper fine particle dispersion according to any one of the aspects <1> to <16> to intervene between the plurality of metal members; and heating the dispersion.

<18> The method for producing a bonded body according to the above aspect <17>, wherein a temperature of a heat treatment in the heating step is not higher than 230° C.

<19> The method for producing a bonded body according to the above aspect <17> or <18>, wherein an atmosphere used in the heating step is an inert gas atmosphere.

<20> The method for producing a bonded body according to any one of the above aspects <17> to <19>, wherein the metal members contain at least one material selected from the group consisting of a gold substrate, a gold-plated substrate, a silver substrate, a silver-plated metal substrate, a copper substrate, a palladium substrate, a palladium-plated metal substrate, a platinum substrate, a platinum-plated metal substrate, an aluminum substrate, a nickel substrate, a nickel-plated metal substrate, a tin substrate, a tin-plated metal substrate, and a metal portion of an electrically insulating substrate.

<21> The method for producing a bonded body according to any one of the above aspects <17> to <20>, wherein bonding of the metal members is at least one selected from the group consisting of bonding between a chip element and a circuit substrate, bonding between a semiconductor chip and a lead frame or a circuit substrate, and bonding between a high heat generation semiconductor chip and a cooling plate.

EXAMPLES

The present invention is described in more detail below by referring to the following Examples, etc. However, these Examples, etc., are not intended to limit the scope of the present invention thereto.

In addition, in the following Production Examples, Examples and Comparative Examples, the "part(s)" and "%" indicate "part(s) by mass" and "% by mass", respectively, unless otherwise specified.

The respective various properties were measured or calculated by the following methods.

[Measurement of Number-Average Molecular Weight Mn of Polymer B]

The number-average molecular weight Mn of the polymer B was measured by gel permeation chromatography. As a sample to be measured, there was used a dispersion prepared by mixing 0.1 g of the polymer with 10 mL of an eluent in a glass vial, stirring the resulting mixture at 25° C. for 10 hours with a magnetic stirrer, and then subjecting the mixture to filtration treatment using a syringe filter "DISMIC-13HP" (PTFE; 0.2 μm) available from Advantec Toyo Kaisha, Ltd. The measuring conditions are shown below.

GPC apparatus: "HLC-8320GPC" available from Tosoh Corporation;

Columns: "TSKgel Super AWM-H", "TSKgel Super AW3000" and "TSKgel guardcolumn Super AW-H" all available from Tosoh Corporation;

Eluent: A solution prepared by dissolving phosphoric acid and lithium bromide in N. N-dimethylformamide such that concentrations of phosphoric acid and lithium bromide in the resulting solution were 60 mmol/L and 50 mmol/L, respectively;

Flow rate: 0.5 mL/min; and

Reference standard substances: Kits of monodisperse polystyrenes [PStQuick B (F-550, F-80, F-10, F-1, A-1000), PStQuick C (F-288, F-40, F-4, A-5000, A-500] all available from Tosoh Corporation.

[Measurement of Acid Value of Polymer B]

The acid value of the polymer B was measured according to the method as defined in JIS K0070-1992 (potetiometric titration method) except that only the mixed solvent of ethanol and ether prescribed as a measuring solvent in JIS K 0070 was replaced with a mixed solvent containing acetone and toluene at a volume ratio [acetone: toluene] of 4:6.

[Calculation of Content of Polyalkylene Glycol Segment in Polymer B]

The content of the polyalkylene glycol segment in the polymer B was calculated by multiplying the part(s) by mass of the monomer as shown below in Table 1 by the ratio of the polyalkylene glycol segment as shown below in Table 2.

[Average Particle Sizes of Copper Nanoparticles a and Copper Microparticles]

The copper nanoparticles A and the copper microparticles were respectively observed and microphotographed by a scanning electron microscope "S-4800" (field emission-type scanning electron microscope) available from Hitachi High-Technologies Corporation to obtain scanning electron microscopic (SEM) images of these particles. The magnification of the respective SEM images was determined according to the particle sizes of the respective particles to microphotograph these particles in the magnification range of from 5000 to 150000 times. The thus obtained SEM images were respectively analyzed by using an image analyzing software "Image J" available from The National Institutes of Health to measure particle sizes of the 100 or more particles per one sample. The arithmetic mean values of the thus measured particle sizes of the copper nanoparticles A and the copper microparticles were defined as respective average particle sizes of the copper nanoparticles A and the copper microparticles.

[Calculation of Polymer Mass Ratio [Polymer B/(Copper Nanoparticles A+Polymer B)]]

Using a differential thermogravimetric simultaneous measurement apparatus (TG/DTA) "STA7200RV" (tradename) available from Hitachi High-Tech Science Corporation, 10 mg of a sample to be measured (a dry powder of the copper nanoparticles A containing the polymer B) was weighed in an aluminum pan cell, heated from 35° C. to 550° C. at a temperature rise rate of 10° C./min under a nitrogen flow of 50 mL/min to measure a reduced mass of the sample. The reduced mass of the sample as measured in a temperature range of from 35° C. to 550° C. was defined as a mass of the polymer B, and a mass of the residue at 550° C. was defined as a mass of the copper nanoparticles A to calculate a polymer mass ratio [polymer B/(copper nanoparticles A+polymer B)] according to the following formula.

Polymer mass ratio=(reduced mass of sample as measured in a temperature range of from 35° C. to 550° C.)/(reduced mass of sample as measured in a temperature range of from 35° C. to 550° C.+mass of residue at 550° C.)

(Production of Polymer B)

Production Example 1

A 1000 mL four-necked round bottom flask equipped with a thermometer, two 100 mL nitrogen bypass-fitted dropping funnels and a refluxing device was charged with 20.0 g of ethanol (guaranteed reagent) available from FUJIFILM Wako Pure Chemical Corporation, and after raising an inside temperature of the flask up to 80° C. in an oil bath, the ethanol in the flask was subjected to bubbling with nitrogen for 10 minutes. Then, 15.3 g of methacrylic acid (guaranteed reagent) available from FUJIFILM Wako Pure Chemical Corporation, 17.2 g of methyl methacrylate (guaranteed reagent) available from FUJIFILM Wako Pure Chemical Corporation, 67.5 g of methoxy polyethylene glycol (EO: 23 mol) methacrylate "PME-1000" available NOF Corporation, 1.0 g of 3-mercaptopropionic acid (guaranteed reagent) available from FUJIFILM Wako Pure Chemical Corporation and 28.7 g of ethanol were dissolved in a plastic beaker, and the resulting solution was charged into the dropping funnel (1). Separately, 51.3 g of ethanol and 1.3 g of 2,2'-azobis (2,4-dimethyl valeronitrile) "V-65" (polymerization initiator) available from FUJIFILM Wako Pure Chemical Corporation were dissolved in a plastic beaker, and the resulting solution was charged into the dropping funnel (2). Then, the respective mixtures in the dropping funnels (1) and (2) were added dropwise into the aforementioned flask at the same time over 90 minutes. After that, the inside temperature of the flask was raised to 90° C., followed by continuously stirring the contents of the flask for 1 hour to terminate the reaction. Using a freeze dryer "Model No.: FDU-2110" available from TOKYO RIKAKIKAI CO., LTD., equipped with a dry chamber "Model No.: DRC-1000" available from TOKYO RIKAKIKAI CO., LTD., the resulting resin solution was freeze-dried under the drying conditions including operations of freezing at −25° C. for 1 hour, pressure reduction at −10° C. for 9 hours and pressure reduction at 25° C. for 5 hours in which a vacuum degree used upon the pressure reduction was 5 Pa, thereby obtaining a polymer B-1 in an absolute dry state (a polymer of methacrylic acid/methyl methacrylate/methoxy polyethylene glycol (EO: 23 mol) methacrylate; acid value: 100 mgKOH/g; Mn: 8,000).

Production Examples 2 to 22

The same procedure as in Production Example 1 was repeated except that the composition of the monomers was changed to those shown in Table 1, thereby obtaining polymers B-2 to B-22.

The details of the monomers used are shown in Table 2.

TABLE 1-1

| | Polymer B | B-1 | B-2 | B-3 | B-4 | B-5 | B-6 |
|---|---|---|---|---|---|---|---|
| Composition of monomers (part(s) by mass) | PEG(4)MA | | 84.4 | | | | |
| | PEG(23)MA | 67.5 | | | | | |
| | PPG(9)MA | | | 71.4 | | | |
| | PPG(34)MA | | | | 65.5 | | |
| | Octyl-PEG(8)PPG(7)MA | | | | | 77.0 | |
| | Lauryl-PEG(30)MA | | | | | | 74.5 |
| | MMA | 17.2 | 0.3 | 13.3 | 19.2 | 7.6 | 10.1 |
| | MAA | 15.3 | 15.3 | 15.3 | 15.3 | 15.3 | 15.3 |
| | St | | | | | | |
| Properties | Number-average molecular weight | 8000 | 8000 | 8600 | 9000 | 8600 | 8800 |
| | Acid value (mgKOH/g) | 100 | 100 | 100 | 100 | 100 | 100 |
| | Content of polyalkylene glycol segment | 63.3% | 63.3% | 63.3% | 63.3% | 63.3% | 63.3% |

| | Polymer B | B-7 | B-8 | B-9 | B-10 | B-11 | B-12 |
|---|---|---|---|---|---|---|---|
| Composition of monomers (part(s) by mass) | PEG(4)MA | | | | | | |
| | PEG(23)MA | 67.5 | 67.5 | 67.5 | 67.5 | | |
| | PPG(9)MA | | | | | | |
| | PPG(34)MA | | | | | | |
| | Octyl-PEG(8)PPG(7)MA | | | | | 77.0 | 77.0 |
| | Lauryl-PEG(30)MA | | | | | | |
| | MMA | 7.2 | 9.5 | | 25.5 | | 16.0 |
| | MAA | 15.3 | 23.0 | 32.5 | 7.0 | 23.0 | 7.0 |
| | St | 10.0 | | | | | |
| Properties | Number-average molecular weight | 8300 | 8000 | 8100 | 8000 | 8600 | 8800 |
| | Acid value (mgKOH/g) | 100 | 150 | 212 | 46 | 150 | 45 |
| | Content of polyalkylene glycol segment | 63.3% | 63.3% | 63.3% | 63.3% | 63.3% | 63.3% |

TABLE 1-2

| Polymer B | | B-13 | B-14 | B-15 | B-16 | B-17 | B-18 | B-19 | B-20 | B-21 | B-22 |
|---|---|---|---|---|---|---|---|---|---|---|---|
| Composition of monomers (part(s) by mass) | PEG(4)MA | | | | | | | 70.0 | | | |
| | PEG(23)MA | 85.0 | 93.0 | | | | 52.0 | | 52.0 | 60.0 | 67.5 |
| | PPG(9)MA | | | | | | | | | | |
| | PPG(34)MA | | | 93.0 | | | | | | | |
| | Octyl-PEG(8)PPG(7)MA | | | | 93.0 | | | | | | |
| | Lauryl-PEG(30)MA | | | | | 93.0 | | | | | |
| | MMA | 8.0 | | | | | 32.5 | | 44.0 | | 30.0 |
| | MAA | 7.0 | 7.0 | 7.0 | 7.0 | 7.0 | 15.5 | 30.0 | 4.0 | 40.0 | 2.5 |
| | St | | | | | | | | | | |
| Properties | Number-average molecular weight | 8600 | 8600 | 9000 | 8800 | 8100 | 8600 | 8600 | 8600 | 9000 | 8500 |
| | Acid value (mgKOH/g) | 46 | 46 | 46 | 46 | 46 | 101 | 195 | 26 | 261 | 16 |
| | Content of polyalkylene glycol segment | 79.7% | 87.2% | 89.9% | 76.4% | 79.0% | 48.8% | 52.5% | 48.8% | 56.3% | 63.3% |

TABLE 2

| | Name of compound | Supplier/ product name | Molecular weight | Molecular weight of polyalkylene glycol segment | Ratio of polyalkylene glycol segment |
|---|---|---|---|---|---|
| PEG(4)MA | Methoxy polyethylene glycol (EO: 4 mol) methacrylate | NOF Corporation/ PME-200 | 276 | 207 | 75.0% |
| PEG(23)MA | Methoxy polyethylene glycol (EO: 23 mol) methacrylate | NOF Corporation/ PME-1000 | 1110 | 1041 | 93.8% |
| PPG(9)MA | Methoxy polypropylene glycol (PO: 9 mol) methacrylate | NOF Corporation/ PP-500D | 609 | 540 | 88.7% |
| PPG(34)MA | Methoxy polypropylene glycol (PO: 34 mol) methacrylate | NOF Corporation/ PP-2000D | 2100 | 2031 | 96.7% |
| Octyl-PEG(8)PPG(7)MA | Octoxy polyethylene glycol (EO: 8 mol) polypropylene glycol (PO: 7 mol) methacrylate | NOF Corporation/ 50POEP-800B | 943 | 775 | 82.2% |
| Lauryl-PEG(30)MA | Lauroxy polyethylene glycol (EO: 30 mol) methacrylate | NOF Corporation/ PLE-1300 | 1580 | 1342 | 84.9% |
| MMA | Methyl methacrylate | FUJIFILM Wako Pure Chemical Corporation/ guaranteed reagent | 100.12 | — | — |
| MAA | Methacrylic acid | FUJIFILM Wako Pure Chemical Corporation/ guaranteed reagent | 86.09 | — | — |
| St | Styrene | FUJIFILM Wako Pure Chemical Corporation/ guaranteed reagent | 104.15 | — | — |

(Synthesis of Copper Nanoparticle Dry Powder)

Synthesis Example 1

A 2 L beaker was charged with 88.4 g of copper sulfate pentahydrate (guaranteed reagent) available from FUJIFILM Wako Pure Chemical Corporation as a copper raw material compound, 0.7 g of an absolute-dry product of the polymer B-1 obtained in Production Example 1 as a dispersant and 1000 g of ion-exchanged water, and the contents of the beaker were stirred with a magnetic stirrer until they became transparent when visually observed, thereby obtaining a mixed solution.

Next, 17.8 g of hydrazine monohydrate (guaranteed reagent) available from FUJIFILM Wako Pure Chemical Corporation was charged into a 50 mL dropping funnel, and then added dropwise to the mixed solution at 25° C. over 60 minutes. Thereafter, the resulting reaction solution was stirred for 5 hours while controlling the temperature of the reaction solution at 40° C. in an oil both, and then air-cooled, thereby obtaining a reddish brown dispersion containing copper nanoparticles dispersed therein.

The whole amount of the thus obtained dispersion was charged into a dialysis tube "Spectra/Por6" (tradename; dialysis membrane: regenerated cellulose; molecular weight cutoff (MWCO)=50 K) available from Repligen Corporation, and the dialysis tube was hermetically closed with a closer at opposite upper and lower ends thereof. The thus closed dialysis tube was dipped in 5 L of ion-exchanged water filled in a 5 L glass beaker, followed by stirring the dispersion for 1 hour while maintaining a temperature of the water in a temperature range of from 20 to 25° C. Thereafter, the whole amount of the ion-exchanged water was replaced with new one every one hour, and the replacement procedure was conducted repeatedly. The copper nanoparticle dispersion was sampled before each replacement procedure, and when the electrical conductivity of the copper nanoparticle dispersion thus sampled was reduced to 7 mS/m or less, the dialysis was terminated to thereby obtain a purified copper nanoparticle dispersion. When measuring the electrical conductivity of the copper nanoparticle dispersion, the copper nanoparticle dispersion was diluted with ion-exchanged water so as to adjust the concentration of copper in the dispersion to 1%.

Using a freeze dryer "Model No.: FDU-2110" available from TOKYO RIKAKIKAI CO., LTD., equipped with a dry chamber "Model No.: DRC-1000" available from TOKYO RIKAKIKAI CO., LTD., the resulting purified copper nanoparticle dispersion was freeze-dried, thereby obtaining 21.3 g of copper nanoparticles A-1 containing the polymer B-1. The freeze-drying conditions used above include operations of freezing at −25° C. for 1 hour, drying under reduced pressure at −10° C. under 5 Pa for 9 hours, and further drying under reduced pressure at 25° C. under 5 Pa for 5 hours, thereby obtaining a dry powder of the copper nanoparticles A-1 containing the polymer B-1. The thus obtained copper nanoparticles A-1 had an average particle size of 160 nm, and the polymer mass ratio thereof was 0.011. The results are shown in Table 3.

Synthesis Examples 2 to 22

The same procedure as in Synthesis Example 1 was repeated except that the dispersant was changed to polymers B-2 to B-22, respectively, as shown in Table 3, thereby obtaining respective copper nanoparticle dry powders. The average particle sizes and polymer mass ratios of the thus obtained respective copper nanoparticles are shown in Table 3.

310" available from Thinky Corporation, thereby obtaining a copper fine particle dispersion 1.

(Production of Bonded Body)

Using the copper fine particle dispersion 1 obtained above, a bonded body was produced by the following method.

First, a stainless steel metallic mask (thickness: 150 μm) having three 6 mm×6 mm square openings formed in rows therethrough was placed on a copper plate (whole thickness: 1 mm) having a size of 30 mm×30 mm. The copper fine particle dispersion was applied onto the copper plate by stencil printing using a metallic squeegee. Thereafter, the copper fine particle dispersion thus applied to the copper plate was dried on a Shamal hot plate "HHP-441" available from AS One Corporation at 120° C. for 10 minutes in the atmospheric air. Then, a silicon chip (thickness: 400 μm) having a size of 5 mm×5 mm onto which titanium, nickel and gold had been applied in this order by sputter treatment was prepared. The silicon chip was put on the copper fine particle dispersion applied onto the copper plate such that the gold on the silicon chip was brought into contact with the copper fine particle dispersion, thereby obtaining a laminate in which the copper plate, the copper fine particle dispersion and the silicon chip were sequentially laminated in this order on each other.

TABLE 3

| | Copper Nanoparticles | Polymer B | Average particle size (nm) | Polymer mass ratio |
|---|---|---|---|---|
| Synthesis Example 1 | A-1 | B-1 | 160 | 0.011 |
| Synthesis Example 2 | A-2 | B-2 | 160 | 0.011 |
| Synthesis Example 3 | A-3 | B-3 | 160 | 0.011 |
| Synthesis Example 4 | A-4 | B-4 | 160 | 0.012 |
| Synthesis Example 5 | A-5 | B-5 | 160 | 0.012 |
| Synthesis Example 6 | A-6 | B-6 | 160 | 0.012 |
| Synthesis Example 7 | A-7 | B-7 | 160 | 0.011 |
| Synthesis Example 8 | A-8 | B-8 | 170 | 0.013 |
| Synthesis Example 9 | A-9 | B-9 | 120 | 0.017 |
| Synthesis Example 10 | A-10 | B-10 | 220 | 0.006 |
| Synthesis Example 11 | A-11 | B-11 | 160 | 0.012 |
| Synthesis Example 12 | A-12 | B-12 | 230 | 0.007 |
| Synthesis Example 13 | A-13 | B-13 | 230 | 0.007 |
| Synthesis Example 14 | A-14 | B-14 | 220 | 0.006 |
| Synthesis Example 15 | A-15 | B-15 | 220 | 0.006 |
| Synthesis Example 16 | A-16 | B-16 | 230 | 0.070 |
| Synthesis Example 17 | A-17 | B-17 | 210 | 0.070 |
| Synthesis Example 18 | A-18 | B-18 | 160 | 0.012 |
| Synthesis Example 19 | A-19 | B-19 | 120 | 0.011 |
| Synthesis Example 20 | A-20 | B-20 | 280 | 0.005 |
| Synthesis Example 21 | A-21 | B-21 | 100 | 0.020 |
| Synthesis Example 22 | A-22 | B-22 | 320 | 0.004 |

Example 1

(Preparation of Copper Fine Particle Dispersion)

Dipropylene glycol (first grade reagent) available from FUJIFILM Wako Pure Chemical Corporation, tetraethylene glycol (first-grade reagent) available from FUJIFILM Wako Pure Chemical Corporation, and the dry powder of the copper nanoparticles A-1 containing the polymer B-1 obtained in Synthesis Example 1 were weighed in amounts of 0.5 g, 0.5 g and 9.0 g, respectively, and charged into an agate mortar, and then mixed and kneaded together until the dry powder disappeared when visually observed. The resulting mixed solution was transferred into a plastic bottle. The plastic bottle was hermetically sealed, and the contents of the thus sealed plastic bottle were stirred at 2000 min 1 (2000 revolutions/min) for 5 minutes using a planetary rotation type stirring device "Planetary Vacuum Mixer ARV- The resulting laminate was fired by the following method to obtain a bonded body. In the method, the laminate was first disposed in a pressure firing device "HTM-1000" available from Meisyo Kiko Co., Ltd., and nitrogen was flowed through an interior of a furnace of the device at a rate of 500 mL/min to replace air in the furnace with the nitrogen. Thereafter, while pressing the laminate between upper and lower heating heads under a pressure of 20 MPa, the temperature of the respective heating heads was raised up to 200° C. over 10 minutes. After being raised to 200° C., the laminate was maintained at 200° C. for 150 seconds to subject the laminate to sintering treatment, thereby obtaining the bonded body as aimed. After the sintering treatment, the heating heads were water-cooled at a rate of −60° C./min, and then the resulting bonded body was retrieved into atmospheric air from the device at a head temperature of 100° C. or lower.

Examples 2 to 23 and Comparative Examples 1 to 5

The same procedure as in Example 1 was repeated except that the composition of the copper fine particle dispersion was changed to those shown in Table 4, thereby obtaining the respective copper fine particle dispersions and bonded bodies of Examples 2 to 23 and Comparative Examples 1 to 5.

The raw materials used for production of the copper fine particle dispersions are shown below.

MA-CO25 (copper microparticles; particle size: 5.0 μm) available from Mitsui Mining & Smelting Co., Ltd.

1050Y (copper microparticles; particle size: 0.8 μm) available from Mitsui Mining & Smelting Co., Ltd.

Dipropylene glycol (DPG; first-grade reagent) available from FUJIFILM Wako Pure Chemical Corporation Tetraethylene glycol (TEG; first-grade reagent) available from FUJIFILM Wako Pure Chemical Corporation PEG 400 (first-grade reagent; Polyalkylene Glycol 400) available from FUJIFILM Wako Pure Chemical Corporation a Terpineol (guaranteed reagent) available from FUJIFILM Wako Pure Chemical Corporation Diethylene glycol monobutyl ether (guaranteed reagent) available from FUJIFILM Wako Pure Chemical Corporation The respective copper fine particle dispersions and bonded bodies obtained in Examples 1 to 23 and Comparative Examples 1 to 5 were subjected to the following evaluation procedures.

<Evaluation>

[Bonding Strength of Bonded Body]

The bonding strength of the bonded body was measured according to the following procedure.

Using a universal bond tester "Prospector" available from Nordson Advanced Technology K.K., the silicon chip of the bonded body was pressed in the horizontal direction at a testing speed of 5 mm/min and a shear height of 50 μm to measure a die shear strength of the bonded body. Three samples for each of the obtained bonded bodies were subjected to the above test, and an average value of the thus measured die shear strengths of the three samples was defined as a bonding strength of the bonded body.

[Storage Stability of Copper Fine Particle Dispersion]

The copper fine particle dispersion was stored under the conditions of a temperature of 25° C. and a humidity of 50% for one month. After that, the same method as described in the aforementioned procedure was conducted to measure a bonding strength of the respective bonded bodies. The results are shown in Table 4.

TABLE 4-1

| | Copper nanoparticles A | | Polymer B | | Copper microparticles | | Dispersion medium C | | | | Properties of polymer B | | Evaluation results | |
| | | | | | | | | | | | Content of | | Bon ding | Storage |
| | Kind | Part(s) by mass | Kind | Part(s) by mass | Kind | Part(s) by mass | Kind | Part(s) by mass | Kind | Part(s) by mass | Acid value (mgKOH/g) | polyalkylene glycol segment | strength (MPa) | stability (MPa) |
|---|---|---|---|---|---|---|---|---|---|---|---|---|---|---|
| Example 1 | A-1 | 8.90 | B-1 | 0.10 | | | DPG | 0.50 | TEG | 0.50 | 100 | 63.3% | 22 | 20 |
| Example 2 | A-2 | 8.90 | B-2 | 0.10 | | | DPG | 0.50 | TEG | 0.50 | 100 | 63.3% | 22 | 20 |
| Example 3 | A-3 | 8.90 | B-3 | 0.10 | | | DPG | 0.50 | TEG | 0.50 | 100 | 63.3% | 24 | 21 |
| Example 4 | A-4 | 8.89 | B-4 | 0.11 | | | DPG | 0.50 | TEG | 0.50 | 100 | 63.3% | 22 | 21 |
| Example 5 | A-5 | 8.89 | B-5 | 0.11 | | | DPG | 0.50 | TEG | 0.50 | 100 | 63.3% | 22 | 22 |
| Example 6 | A-6 | 8.89 | B-6 | 0.11 | | | DPG | 0.50 | TEG | 0.50 | 100 | 63.3% | 23 | 24 |
| Example 7 | A-7 | 8.90 | B-7 | 0.10 | | | DPG | 0.50 | TEG | 0.50 | 100 | 63.3% | 22 | 20 |
| Example 8 | A-8 | 8.88 | B-8 | 0.12 | | | DPG | 0.50 | TEG | 0.50 | 150 | 63.3% | 22 | 21 |
| Example 9 | A-9 | 8.85 | B-9 | 0.15 | | | DPG | 0.50 | TEG | 0.50 | 212 | 63.3% | 21 | 21 |
| Example 10 | A-10 | 8.95 | B-10 | 0.05 | | | DPG | 0.50 | TEG | 0.50 | 46 | 63.3% | 22 | 21 |
| Example 11 | A-11 | 8.89 | B-11 | 0.11 | | | DPG | 0.50 | TEG | 0.50 | 150 | 63.3% | 22 | 20 |
| Example 12 | A-12 | 8.94 | B-12 | 0.06 | | | DPG | 0.50 | TEG | 0.50 | 45 | 63.3% | 25 | 22 |
| Example 13 | A-13 | 8.94 | B-13 | 0.06 | | | DPG | 0.50 | TEG | 0.50 | 46 | 79.7% | 25 | 23 |
| Example 14 | A-14 | 8.95 | B-14 | 0.05 | | | DPG | 0.50 | TEG | 0.50 | 46 | 87.2% | 32 | 30 |
| Example 15 | A-15 | 8.95 | B-15 | 0.05 | | | DPG | 0.50 | TEG | 0.50 | 46 | 89.9% | 34 | 32 |
| Example 16 | A-16 | 8.37 | B-16 | 0.63 | | | DPG | 0.50 | TEG | 0.50 | 46 | 76.4% | 28 | 27 |
| Example 17 | A-17 | 8.37 | B-17 | 0.63 | | | DPG | 0.50 | TEG | 0.50 | 46 | 79.0% | 29 | 27 |
| Example 18 | A-1 | 8.90 | B-1 | 0.10 | | | DPG | 0.50 | PEG400 | 0.50 | 100 | 63.3% | 22 | 20 |

TABLE 4-2

| | Copper nanoparticles A | | Polymer B | | Copper microparticles | | Dispersion medium C | |
| | Kind | Part(s) by mass | Kind | Part(s) by mass | Kind | Part(s) by mass | Kind | Part(s) by mass |
|---|---|---|---|---|---|---|---|---|
| Example 19 | A-7 | 8.90 | B-7 | 0.10 | | | α-Terpineol | 0.50 |
| Example 20 | A-15 | 8.95 | B-15 | 0.05 | | | PEG400 | 0.50 |
| Example 21 | A-1 | 5.90 | B-1 | 0.10 | MA-C025 | 3.00 | DPG | 0.50 |
| Example 22 | A-5 | 5.89 | B-5 | 0.11 | 1050Y | 3.00 | TEG | 0.50 |
| Example 23 | A-15 | 5.95 | B-15 | 0.05 | MA-C025 | 3.00 | DPG | 0.50 |

TABLE 4-2-continued

| | | | | | | |
|---|---|---|---|---|---|---|
| Comparative Example 1 | A-18 | 8.89 | B-18 | 0.11 | DPG | 0.50 |
| Comparative Example 2 | A-19 | 8.90 | B-19 | 0.10 | DPG | 0.50 |
| Comparative Example 3 | A-20 | 8.96 | B-20 | 0.05 | DPG | 0.50 |
| Comparative Example 4 | A-21 | 8.82 | B-21 | 0.18 | DPG | 0.50 |
| Comparative Example 5 | A-22 | 8.96 | B-22 | 0.04 | DPG | 0.50 |

| | Dispersion medium C | | Properties of polymer B | | Evaluation results | |
|---|---|---|---|---|---|---|
| | Kind | Part(s) by mass | Acid value (mgKOH/g) | Content of polyalkylene glycol segment | Bonding strength (MPa) | Storage stability (MPa) |
| Example 19 | Diethylene glycol monobutyl ether | 0.50 | 100 | 63.3% | 22 | 22 |
| Example 20 | Diethylene glycol monobutyl ether | 0.50 | 46 | 89.9% | 29 | 29 |
| Example 21 | PEG400 | 0.50 | 100 | 63.3% | 35 | 33 |
| Example 22 | α-Terpineol | 0.50 | 100 | 63.3% | 31 | 30 |
| Example 23 | PEG400 | 0.50 | 46 | 89.9% | 38 | 36 |
| Comparative Example 1 | TEG | 0.50 | 101 | 48.8% | 18 | 17 |
| Comparative Example 2 | TEG | 0.50 | 195 | 52.5% | 18 | 18 |
| Comparative Example 3 | TEG | 0.50 | 26 | 48.8% | 18 | 17 |
| Comparative Example 4 | TEG | 0.50 | 261 | 56.3% | x* | Not evaluated |
| Comparative Example 5 | TEG | 0.50 | 16 | 63.3% | 21 | x** |

Note:

x*: Undispersible;

x**: Occurrence of a large amount of aggregates, uncoatable.

As recognized from Table 4, the copper fine particle dispersions obtained in Examples 1 to 23 were capable of providing the bonded bodies that were improved in bonding strength even when subjected to pressure firing at 200° C. in a nitrogen atmosphere, as compared to the copper fine particle dispersions obtained in Comparative Examples 1 to 5, and the bonded bodies obtained using the copper fine particle dispersions of Examples 1 to 23 even after storing the dispersions for one month exhibited good bonding strength. From the above results, it was confirmed that the copper fine particle dispersions of the present invention were capable of improving bonding strength of the resulting bonded bodies even under the firing conditions of a temperature of 200° C. in a nitrogen atmosphere, and also had good storage stability.

The invention claimed is:

1. A copper fine particle dispersion comprising copper nanoparticles A dispersed in the copper fine particle dispersion with a polymer B, and a dispersion medium C, wherein:

the polymer B comprises a constitutional unit derived from a carboxy group-containing monomer (b-1) and a constitutional unit derived from a polyalkylene glycol segment-containing monomer (b-2);

a content of the polyalkylene glycol segment in the polymer B is not less than 55% by mass and not more than 97% by mass;

an acid value of the polymer B is not less than 20 mgKOH/g and not more than 250 mgKOH/g;

the dispersion medium C comprises at least one compound selected from the group consisting of a (poly) alkylene glycol, a (poly)alkylene glycol derivative, a terpene alcohol, glycerin and a glycerin derivative, and an average particle size of the copper nanoparticles A is not less than 105 nm and not more than 270 nm.

2. The copper fine particle dispersion according to claim 1, wherein a content of the copper nanoparticles A in the copper fine particle dispersion is not less than 30% by mass and not more than 95% by mass.

3. The copper fine particle dispersion according to claim 1, wherein a mass ratio of a content of the polymer B to a total content of the copper nanoparticles A and the polymer B [polymer B/(copper nanoparticles A+polymer B)] is not less than 0.0055 and not more than 0.025.

4. The copper fine particle dispersion according to claim 1, wherein a content of the dispersion medium C in the copper fine particle dispersion is not less than 4% by mass and not more than 60% by mass.

5. The copper fine particle dispersion according to claim 1, wherein a boiling point of the dispersion medium C is not lower than 180° C., and a molecular weight of the dispersion medium C is not more than 600.

6. The copper fine particle dispersion according to claim 1, further comprising copper microparticles.

7. The copper fine particle dispersion according to claim 6, wherein a content of the copper microparticles in the copper fine particle dispersion is not less than 5% by mass and not more than 65% by mass.

8. The copper fine particle dispersion according to claim 6, wherein an average particle size of the copper microparticles is more than 0.27 μm and not more than 10 μm.

9. The copper fine particle dispersion according to claim 1, wherein the copper fine particle dispersion is capable of bonding a plurality of metal members to each other.

10. A method for producing a bonded body, comprising allowing the copper fine particle dispersion according to claim 1 to intervene between a plurality of metal members; and heating the copper fine particle dispersion.

11. The method for producing a bonded body according to claim 10, wherein the heating is to a temperature not higher than 230° C.

12. The method for producing a bonded body according to claim 10, wherein an atmosphere used in the heating is an inert gas atmosphere.

13. The method for producing a bonded body according to claim 10, wherein the plurality of metal members respectively comprise at least one material selected from the group consisting of a gold substrate, a gold-plated substrate, a silver substrate, a silver-plated metal substrate, a copper substrate, a palladium substrate, a palladium-plated metal substrate, a platinum substrate, a platinum-plated metal substrate, an aluminum substrate, a nickel substrate, a nickel-plated metal substrate, a tin substrate, a tin-plated metal substrate, and a metal portion of an electrically insulating substrate.

14. The method for producing a bonded body according to claim 10, wherein a bonding of the plurality of metal members is at least one selected from the group consisting of bonding between a chip element and a circuit substrate, bonding between a semiconductor chip and a lead frame or a circuit substrate, and bonding between a high-heat generation semiconductor chip and a cooling plate.

15. The copper fine particle dispersion according to claim 1, wherein the constitutional unit derived from the carboxy group-containing monomer (b-1) is (meth)acrylic acid.

16. The copper fine particle dispersion according to claim 1, wherein a content of the constitutional unit derived from the carboxy group-containing monomer (b-1) in the polymer B is not less than 3% by mass and not more than 35% by mass.

17. The copper fine particle dispersion according to claim 1, wherein the constitutional unit derived from the polyalkylene glycol segment-containing monomer (b-2) is at least one monomer selected from the group consisting of a polyalkylene glycol (meth)acrylate and an alkoxypolyalkylene glycol (meth)acrylate wherein an alkoxy group has not less than 1 and not more than 18 carbon atoms.

18. The copper fine particle dispersion according to claim 1, wherein a content of the constitutional unit derived from the polyalkylene glycol segment-containing monomer (b-2) in the polymer B is not less than 55% by mass and not more than 97% by mass.

19. The copper fine particle dispersion according to claim 1, wherein a number-average molecular weight Mn of the polymer B is not less than 4,000 and not more than 50,000.

\* \* \* \* \*